(12) United States Patent
Chelba et al.

(10) Patent No.: US 8,175,878 B1
(45) Date of Patent: *May 8, 2012

(54) REPRESENTING N-GRAM LANGUAGE MODELS FOR COMPACT STORAGE AND FAST RETRIEVAL

(75) Inventors: Ciprian Chelba, Palo Alto, CA (US); Thorsten Brants, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,108

(22) Filed: Dec. 14, 2010

Related U.S. Application Data

(63) Continuation of application No. 11/693,613, filed on Mar. 29, 2007, now Pat. No. 7,877,258.

(51) Int. Cl.
*G10L 15/18* (2006.01)
*G10L 15/06* (2006.01)
*G06F 17/27* (2006.01)

(52) U.S. Cl. .............. 704/257; 704/9; 704/240; 704/244

(58) Field of Classification Search ........................ None
See application file for complete search history.

(56) References Cited

U.S. PATENT DOCUMENTS

| | | | |
|---|---|---|---|
| 6,363,348 B1 | 3/2002 | Besling et al. | |
| 7,231,349 B2 | 6/2007 | Li et al. | |
| 7,275,029 B1 | 9/2007 | Gao et al. | |
| 7,363,225 B2 | 4/2008 | Church et al. | |
| 7,774,197 B1 * | 8/2010 | Bulyko | 704/9 |
| 7,921,011 B2 * | 4/2011 | Hernandez Abrego et al. | 704/254 |
| 2007/0078653 A1 | 4/2007 | Olsen | |

OTHER PUBLICATIONS

P. Clarkson and R. Rosenfeld, "Statistical language modeling using the CMU-Cambridge toolkit," in Fifth European Conference on Speech Communication and Technology. ISCA, 1997, 4 pages.

Clarkson, et al. "Statistical Language Modeling Toolkit", Jun. 1999, Cambridge (5 pages).

Dean, et al., "MapReduce: Simplified Data Processing on Large Clusters", OSDI'04: Sixth Symposium on Operating System Design and Implementation, 2004, San Francisco, CA. (13 pages).

B. Hsu and J. Glass, "Iterative language model estimation: efficient data structure & algorithms," in Proc. Interspeech, Brisbane, Australia: ISCA, Sep. 22-26, 2008, pp. 841-844.

Ghemawat, et al., "The Google File System", Oct. 2003, New York (15 pages).

Raj, B.; Whittaker, E.W.D.; "Lossless compression of language model structure and word identifiers," Acoustics, Speech, and Signal Processing, 2003. Proceedings. (ICASSP '03). 2003 IEEE International Conference on, vol. 1, Publication Year: 2003, pp. 1-388-1-391 vol. 1.

(Continued)

*Primary Examiner* — Matthew Sked
(74) *Attorney, Agent, or Firm* — Harness, Dickey & Pierce, P.L.C.

(57) ABSTRACT

Systems, methods, and apparatuses, including computer program products, are provided for representing language models. In some implementations, a computer-implemented method is provided. The method includes generating a compact language model including receiving a collection of n-grams from the corpus, each n-gram of the collection having a corresponding first probability of occurring in the corpus and generating a trie representing the collection of n-grams. The method also includes using the language model to identify a second probability of a particular string of words occurring.

11 Claims, 6 Drawing Sheets

OTHER PUBLICATIONS

R. Rosenfeld, "The CMU statistical language modeling toolkit and its use in the 1994 ARPA CSR evaluation," in Proceedings of the Spoken Language Systems Technology Workshop, Jan. 22-25, 1995, pp. 47-50.

K. Seymore and R. Rosenfeld, "Scalable backoff language models," in Proceedings ICSLP 96, vol. 1, Philadelphia, PA, Oct. 3-6, 1996, pp. 232-235.

SRI International, "SRILM—The SRI Language Modeling Toolkit", 2006, Menlo Park, CA (2 pages).

A. Stolcke, "Entropy-based pruning of backoff language models," in Proceedings of News Transcription and Understanding Workshop, Lansdowne, VA: DARPA, Feb. 8 11, 1998, pp. 270-274.

A. Stolcke, "SRILM—an extensible language modeling toolkit," in Proceedings of the International Conference on Spoken Language Processing, Denver, CO, Sep. 2002, pp. 901-904.

D. Talbot and M. Osborne, "Smoothed bloom filter language models: Tera-scale LMs on the cheap," in Proceedings of the 2007 Joint Conference on EMNLP and CoNLL, Prague, Czech Republic, Jun. 2007, pp. 468-476.

D. Talbot and T. Brants, "Randomized language models via perfect hash functions," in Proceedings of ACL-08: HLT, Columbus, OH: Association for Computational Linguistics, Jun. 2008, pp. 505-513.

E. Whittaker and B. Raj, "Quantization-based language model compression," Mitsubishi Electric Research Laboratories, Tech. Rep. TR-2001-41, Dec. 2001, 6 pages.

Wu et al., "Reducing Language model size by Importance-based pruning and rank-Based Quantization," Oriental-COCOSDA, pp. 156-159, Oct. 1-3, Sentosa, Singapore, 2003.

* cited by examiner

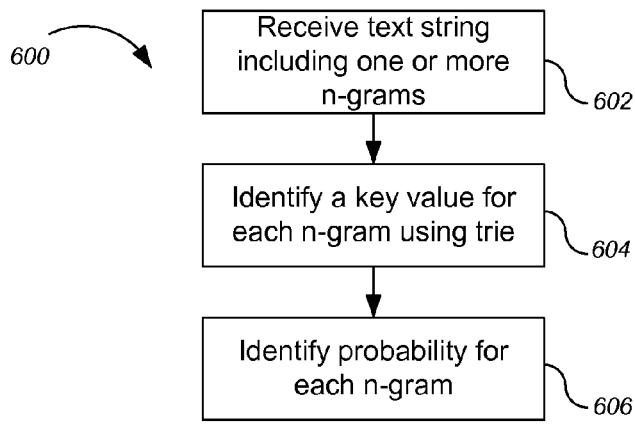
FIG. 6
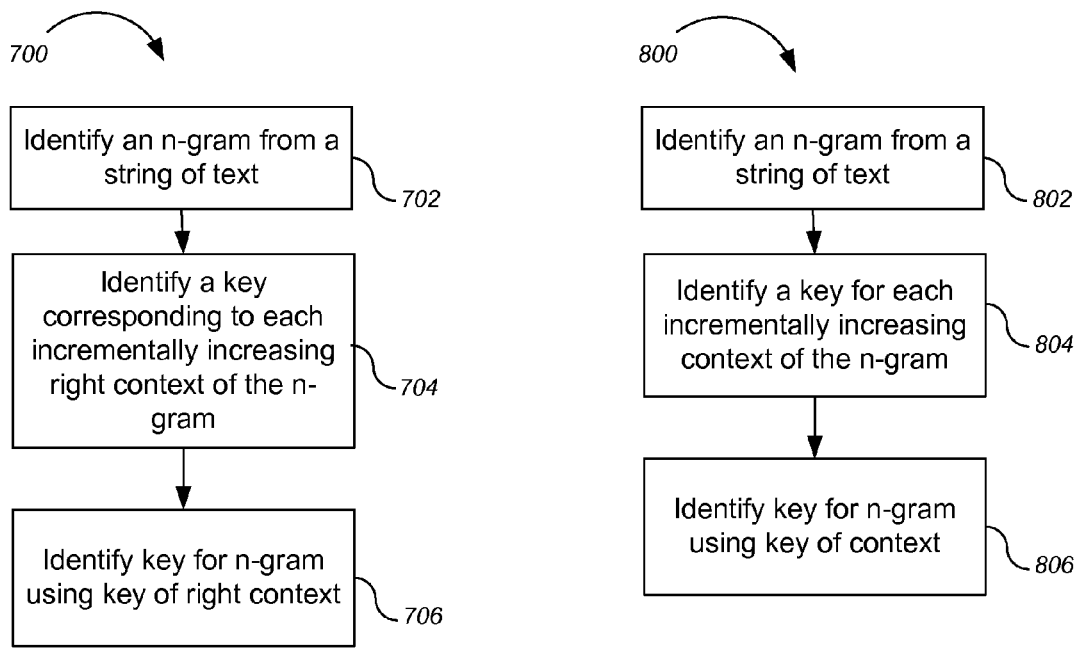
FIG. 7
FIG. 8

REPRESENTING N-GRAM LANGUAGE MODELS FOR COMPACT STORAGE AND FAST RETRIEVAL

CROSS-REFERENCE TO RELATED APPLICATIONS

Under 35 U.S.C. §120, this application claims benefit of pending U.S. application Ser. No. 11/693,613, filed Mar. 29, 2007, the entire contents of which are hereby incorporated by reference.

BACKGROUND

This specification relates to language models stored for digital language processing.

Language models are used to model a probability that a string of words in a given vocabulary will appear in a language. For example, language models are used in automatic speech recognition, machine translation, and optical character recognition applications. Modeling the probability for a string of words in the vocabulary is typically performed using a chain rule and calculating the probability of a given word, w, in a given string context, p(w|context), where the context is the words in the string preceding the given word, w.

In an n-gram language model, the words in the vocabulary are formed into n-grams. An n-gram is a sequence of n consecutive words. An n-gram has an order, which is the number of words in the n-gram. For example, a 1-gram (or unigram) include one word; a 2-gram (or bi-gram) includes two words.

A given n-gram can be described according to different portions of the n-gram. An n-gram can be described as a context and a future word, (context, w), where the context has a length n−1 and w represents the future word. For example, the 3-gram "the black sheep" can be described in terms of an n-gram context and a future word. The n-gram context includes all words of the n-gram preceding the last word of the n-gram. In the given example, "the black" is the context. The left most word in the context is referred to as the left word. The future word is the last word of the n-gram, which in the example is "sheep". The n-gram can also be described with respect to a right context and a backed off context. The right context includes all words of the n-gram following the first word of the n-gram, represented as a (n−1)-gram. In the example above, "black sheep" is the right context. Additionally, the backed off context is the context of the n-gram less the left most word in the context. In the example above, "black" is the backed off context.

The probability according to the n-gram language model that a particular string will occur can be determined using the chain rule. The chain rule determines a probability of a string as a product of individual probabilities. Thus for a given string "$e_1, e_2, \ldots, e_k$", the probability for the string, $p(e_1, e_2, \ldots e_k)$, is equal to:

$$\prod_{i=1}^{k} p(e_i | e_1, \ldots, e_{i-1})$$

The n-gram language model can be limited to a particular maximum size n-gram, e.g., limited to 1-grams, 2-grams, 3-grams, etc. For example, for a given string "NASA officials say they hope," where the maximum n-gram order is limited to 3-grams, the probability for the string can be determined as a product of conditional probabilities as follows: p(NASA officials say they hope)=p(NASA)×p(officials|NASA)×p(say|NASA officials)×p(they|officials say)×p(hope|say they). This can be generalized to:

$$p(e_1, \ldots, e_k) = \prod_{i=1}^{k} p(e_i | e_{i-n+1}, \ldots, e_{i-1})$$

where n is the order of the largest n-gram allowed in the language model.

The conditional probabilities are generally determined empirically, according to relative frequencies in a corpus of text. For example, in the example above, the probability of the word "say" given the context of "NASA officials" is given by:

$$p(\text{say} | \text{NASA officials}) = \frac{f(\text{NASA officials say})}{f(\text{NASA officials})},$$

where f (NASA officials say) is a frequency or a count of the occurrences of the string "NASA officials say" in the corpus. Conditional probabilities for strings within the maximum n-gram order in the n-gram language model correspond to the probability stored in the language model for the n-gram, e.g., p(say|NASA officials) is the conditional probability stored in the language model for the 3-gram entry "NASA officials say".

SUMMARY

Systems, methods, and apparatuses, including computer program products, are provided for representing language models. In general, in one aspect, a computer-implemented method is provided. The method includes generating a compact language model including receiving a collection of n-grams from the corpus, each n-gram of the collection having a corresponding first probability of occurring in the corpus, and generating a trie representing the collection of n-grams, and using the language model to identify a second probability of a particular string of words occurring. Other embodiments of this aspect include corresponding systems, apparatus, and computer program products.

In general, in one aspect, a system is provided. The system includes a language model of text including a trie representation of the language model, the language model including a collection of n-grams from the corpus, each n-gram having a corresponding probability of occurring in a corpus, the language model represented as a trie structure assigning distinct values identifying each distinct n-gram of the collection, the trie structure constructed using vectors generated using the collection of n-grams.

In general, in one aspect, a computer-implemented method is provided. The method includes receiving a collection of n-grams, each n-gram having a corresponding first probability of occurring, generating a trie using a first vector and a second vector, the trie assigning one or more values identifying each n-gram in the collection of n-grams, and using the trie to identify probabilities of occurring for n-grams of a received string. Other embodiments of this aspect include corresponding systems, apparatus, and computer program products.

Particular embodiments of the subject matter described in this specification can be implemented to realize one or more of the following advantages. The n-gram language model can be represented in a compact form using a number of vectors defining a trie structure that requires less storage space than other language model forms. Encoding integer vectors forming the trie structure further reduces storage requirements. Additionally, the trie structure can be used with a segmented language model for distributed storage of the language model providing rapid response time for n-gram searches.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flowchart illustrating a method for identifying the probability for n-grams in a string using a trie.

FIG. 7 is a flowchart illustrating a method for identifying a key value for an n-gram using the trie of FIG. 4

FIG. 8 is a flowchart illustrating a method for identifying a key value for an n-gram using the trie of FIG. 5.

Like reference numbers and designations in the various drawings indicate like elements.

DETAILED DESCRIPTION

Figure 1:
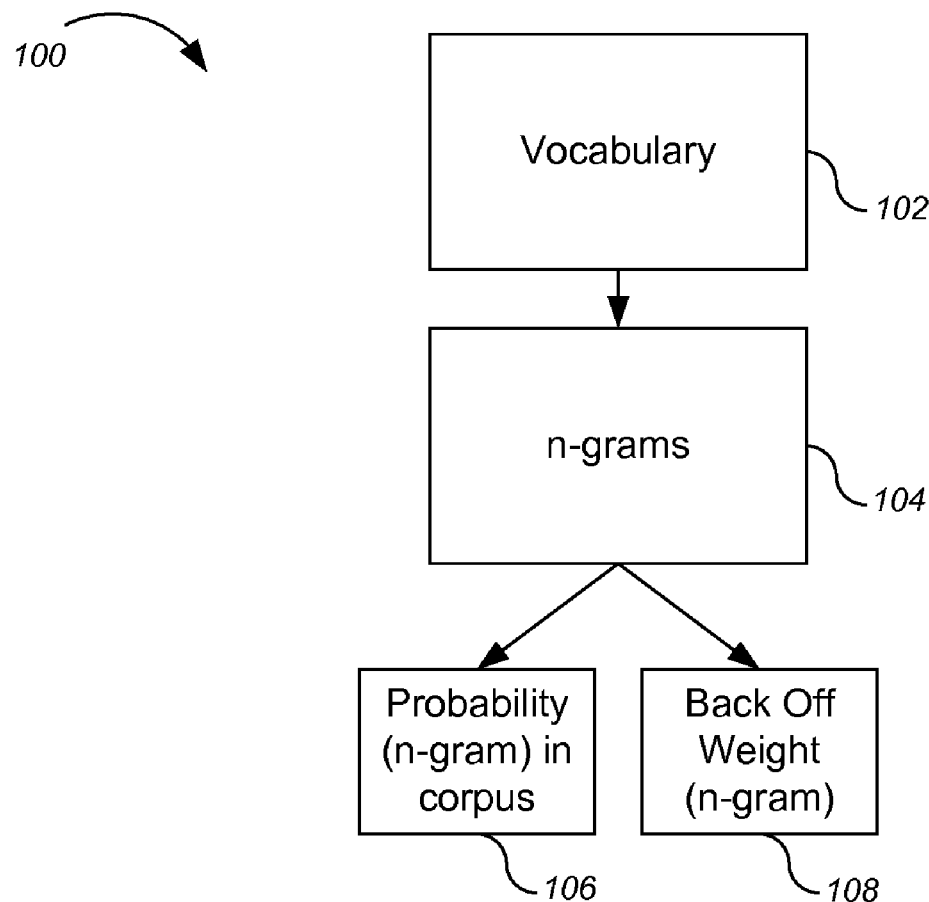
FIG. 1 is a block diagram illustrating components for building a language model.

FIG. 1 is a block diagram illustrating components for building a language model 100. The language model 100 includes a vocabulary 102 and a collection of n-grams 104. The vocabulary 102 is a collection of distinct words found in a corpus of text used to train the language model. The corpus can include a number of different sources of text, including, e.g., web pages and news articles. In some implementations, the corpus includes text on the order of tens to hundreds of billions of words, or even more. One such corpus is the Linguistic Data Consortium ("LDC") Web 1T 5-gram Version 1 corpus, LDC Catalog No.: DC2006T13, ISBN: 1-58563-397-6, contributed by Google™ Inc. In this corpus, the length of the n-grams ranges from unigrams (single words) to five-grams, and each n-gram has an n-gram count generated from approximately one trillion word tokens (including individual words, punctuation, markers identifying a beginning and end of individual sentences) of text from publicly accessible Web pages. In general, the corpus can be a single language or can include several languages, e.g., for machine translation applications, for which a language model can be built for each language. For example, a sample corpus could include texts of 200 billion English words, 88 billion Chinese words, and 30 billion German words.

The words in the vocabulary 102 are used to form n-grams 104. The n-grams can be stored, for example, in an n-gram table. The maximum order of the n-grams can be specified. For example, if the model has a maximum order of five, the collection of n-grams would include all occurring 1-grams, 2-grams, 3-grams, 4-grams, and 5-grams. The number of n-grams can be reduced by mapping rare words to a single "unknown word" placeholder, e.g., "<UNK>", in the n-grams. A rare word is one that occurs very infrequently in the corpus, for example, with a frequency of less than once per five billion words of text. Thus, some multiple n-gram entries can be reduced to a single n-gram entry. For example, the n-gram "word-A word-B RareWord1 word-C word-D" and the n-gram "word-A word-B RareWord2 word-C word-D" can both be mapped to the n-gram "word-A word-B<UNK> word-C word-D".

Each n-gram stored in the language model 100 has an associated probability 106. The probability 106 is the conditional probability of each n-gram according to a frequency in which the n-gram occurs in the corpus.

A back-off weight can optionally be determined for n-grams having an order less than the maximum order. For example, for an n-gram language model having a maximum order of three, back off weights can be determined for each 1-gram and 2-gram. The back-off weight ("BOW") is a factor applied to estimate the probability for an n-gram when it is not found in the collection of n-grams 106. For example, if a particular 3-gram (word 1, word 2, word 3) is not found in the collection of n-grams 106, the probability of the third word given the first and second word of the n-gram, p(word 3|word1 word 2) can still be determined. The probability can be determined as a function of the BOW and a probability for the third word of the n-gram given the second word, p(word 3|word 2), such that p(word 3|word 1 word 2)=BOW(word1 word2) p(word 3|word 2). The BOW can be determined, for example, according to the probability associated with the context of the given n-gram in the corpus in order to assess a likelihood that word 1 will be followed by word 2.

For example, if the n-gram "the black sheep" is not found in the language model, its probability can still be determined. The probability for the full n-gram "the black sheep" is equal to the probability of "sheep" given "black" (e.g., p(sheep|black), i.e., the probability of the n-gram "black sheep", multiplied by the BOW for the n-gram "the black"

In some implementations, the language model includes a table that includes n-grams and their respective probabilities and back-off weights, where applicable. The table can be used to identify the probability of a given string (e.g., one received to be tested against the language model) using the n-grams of the string. The string can include words, punctuation, and other text. Additionally, the string can include other information identifying a sentence beginning, a sentence end, and other information about the contents of the string. Additionally, using the back-off weights, the language model can be used to determine a probability for an n-gram that is not found in the corpus. This type of language model can be referred to as a back-off n-gram language model.

The language model for a corpus can be very large. In some implementations, the language model is built using distributed processing. For example, when building the language model, the raw data of the corpus can be separated into a number of different parts by sharding the corpus. Sharding refers to the process of separating a large data set into smaller pieces. A sharding function applies a unique shard identifier to chunks of data in the corpus, splitting the large data set into a number of disjoint subsets. There can be redundancy in the data contained within shards, for example, for efficiency or to protect against hardware failures for a particular shard.

The data forming the language model can be distributed, for example, according to the Google™ File System (GFS). The GFS architecture includes a GFS cluster having a single master and multiple "chunkservers". Files are divided into fixed size chunks, which are uniquely identified by the master and stored on a particular chunkserver. Each chunk can be replicated on multiple chunkservers. The master includes file system metadata. This includes namespace, access control information, mapping from files to chunks, and locations of chunks. Additional information about GFS can be found in Ghemawat et al., "The Google File System", Symposium on Operating System Principles, Oct. 19-20, 2003.

In some implementations, the data contained in each shard is processed in parallel to identify words including sentence beginning ("<s>") and end ("</s>") marker. The processed information can be used when generating the vocabulary for the language model, which includes sentence markers as words, as will be described below. For example, a MapReduce process can be undertaken to process the data.

The term MapReduce describes both a programming model and an implementation of the model for processing and generating large data sets. The model and its library implementation will both be referred to as MapReduce. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter-machine communication.

A MapReduce computation takes a set of input (key, value) pairs, and produces a set of output (key, value) pairs. The user expresses the computation as two functions: Map and Reduce.

Map, written, e.g., by a programmer, takes an input (key, value) pair and produces a set of intermediate (key, value) pairs. The MapReduce library groups together all intermediate values associated with the same intermediate key I and passes them to the Reduce function.

The Reduce function, also written, e.g., by a programmer, accepts an intermediate key I and a set of values for that key. It merges together these values to form a possibly smaller set of values. Typically just zero or one output value is produced for each Reduce invocation. The intermediate values are supplied to the user's reduce function through an iterator. In this way lists of values that are too large to fit in memory can be handled. Additional details of MapReduce are described in J. Dean and S. Ghemawat, MapReduce: Simplified Data Processing on Large Clusters, Proceedings of the 6th Symposium on Operating Systems Design and Implementation, pp. 137 150 (Dec. 6, 2004), the contents of which are incorporated here by reference.

The Map phase takes an input (key, value) pair and produces an intermediate (key, value) pair. In particular, the input (key, value) pairs to the map phase correspond to a key identifying the node and a value that is the text in the node. The intermediate (key, value) pair has a key value corresponding to individual words and a corresponding value for the word. The Reduce phase reduces the intermediate (key, value) pairs having the same key into a single output (key, value). Specifically, the reduce outputs a vocabulary for the words in the corpus and their frequencies, (word, frequency).

For example, for three shards S1, S2, and S3, the vocabulary and word frequencies can be generated. Shard S1 includes corpus text "a rose". Shard S2 includes the text "is a rose". Shard S3 includes the text "a rose is a rose". During the Map phase, the input for each shard is key=ID and value=sentence. The map output is: key=word and value=1. In particular, the map from S1 produces intermediate (key, value) pairs:
(<s>, 1)
(a, 1)
(rose, 1)
(</s>, 1).

The map from S2 is output as intermediate (key, value) pairs:
(<S>, 1)
(is, 1)
(a, 1)
(rose, 1)
(</s>, 1).

Finally, the map from S3 produces intermediate (key, value) pairs:
(<s>, 1)
(a, 1)
(rose, 1)
(is, 1)
(a, 1)
(rose, 1)
(</s>, 1).

In some implementations, intermediate (key, value) pairs can be optimized before reduce phase by simplifying redundant entries. For example, the intermediate (key, value) pairs from S3 can be optimized to:
(<s>, 1)
(a, 2)
(rose, 2)
(is, 1)
(</s>, 1).

During the Reduce phase, the intermediate (key, value) pairs are combined to produce output (key, value) pairs where the key=word and value=count. The resulting output (key, value) pairs in the example are:
(<s>, 3)
(a, 4)
(is, 2)
(rose, 4)
(</s>, 3).

The results of the Reduce phase provide a vocabulary for the text in the corpus as well as the word frequencies. In some implementations, a particular reduce shard is identified for intermediate (key, values) of a particular shard using, for example, a hash function.

The parallelization processing using MapReduce can also be used to identify n-gram frequencies within the corpus. The Map phase can process the corpus shards in view of the vocabulary. The Reduce phase combines n-grams such that the output (key, value) pairs are (n-gram, frequency) pairs.

For example, three example shards are used to illustrate the n-gram frequency for 2-grams using MapReduce. The example shards are S4, S5, and S6. Shard S4 includes the text "a rose foo". Shard S5 includes the text "is a rose bar" and the shard S6 includes the text "a rose is a rose".

During the Map phase, a map function is applied for the input (key, value) for the node as a function of the vocabulary. The vocabulary in this example is (<s>, </s>, <UNK>, a, is, rose), where <UNK> represents rare words in the language model e.g., "foo". The intermediate (key, value) pairs produced in the map phase have keys equal to 2-grams and a value for the 2-gram. Thus, for S4, the intermediate (key, value) pairs are:
(<S> a, 1)
(a rose, 1)
(rose <UNK>, 1)
(<UNK> </s>, 1).

For S5, the intermediate (key, value) pairs are:
(<s> is, 1)
(is a, 1)
(a rose, 1)
(rose <UNK>, 1)
(<UNK> </s>, 1).

Finally, the intermediate (key, value) pairs for S6 are:
(<s> a, 1)
(a rose, 1)
(rose is, 1)
(is a, 1)
(a rose, 1)
(rose </s>, 1).

During the Reduce phase, the intermediate (key, value) pairs are combined to produce output (key, value) pairs where the keys are the distinct 2-grams and the value is the count for each n-gram: key=2-gram, value=count. The resulting output (key, value) pairs in the example are:
(<s> a, 2)
(<s> is, 1)
(a rose, 3)
(is a, 2)
(rose is, 1)
(rose <UNK>, 2)
(rose </s>, 1)
(<UNK> </s>, 2).

Thus, the results of the Reduce phase provide 2-grams along with their frequencies in the corpus.

The relative frequency of n-grams in the corpus can also be identified using MapReduce. For example, n-grams can be divided into a number of shards. The input of n-grams and frequencies can be processed in the Map and Reduce phases to produce relative frequencies for the n-grams in a similar manner as describe above.

To summarize, a language model can be generated from a corpus in the following steps. The system generates a vocabulary. Using input text from the corpus, the system outputs a vocabulary of 1-grams and their frequencies. Next, n-grams and their frequencies are identified. The n-grams and their frequencies are identified using the text and vocabulary as input. Relative frequencies for the n-grams are calculated using the n-grams and their respective frequencies. Each step in the process can be implemented using MapReduce as described above.

The language model 100 can be encoded as data blocks according to an Advanced Research Projects Agency ("ARPA") Language Model format. The ARPA format organizes the n-grams in the vocabulary according to n-gram order (1-grams, 2-grams, . . . , n-grams). Additionally, for each order, the ARPA format identifies a probability for each n-gram, the n-gram, and the BOW for each n-gram having an order less than the maximum order. Thus, at the highest order, only the probability of the n-gram and the n-gram are listed in an n-gram table. The listing of 1-grams provides the ordering of words in the language model vocabulary. The listing of 1-grams, therefore, also corresponds to the vocabulary of the language model.

Figure 2:
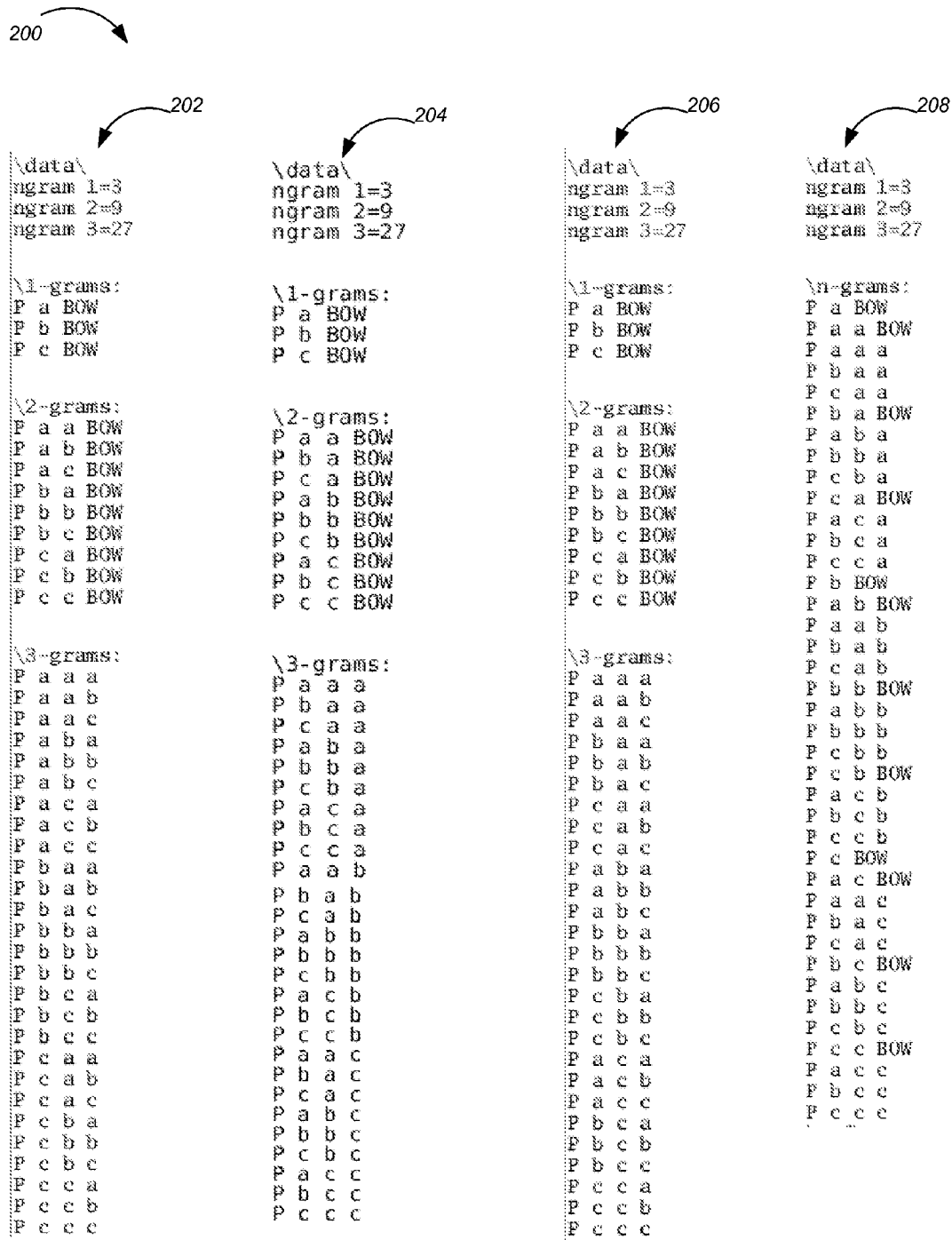
FIG. 2 shows example n-gram sorting techniques.

The n-grams represented by the language model can be sorted according to different criteria. FIG. 2 shows example n-gram sorting techniques 200. The n-gram sorting techniques 200 are shown for a simplified vocabulary of three words: a, b, c.

A first sorting technique is a direct full n-gram sort 202. The direct full n-gram sort 202 lists n-grams in direct traversal order from the left-most word to the right-most word. Thus, as shown in the direct full n-gram sort 202, for each order of n-gram, the possible combinations of words for each n-gram are organized such that the rightmost word is changed most frequently, while the leftmost word stays the same for every possible n-gram beginning with that word. For example, for 2-grams, the left word "a" is the same for each possible right word (e.g., a a; a b; a c).

A second sorting technique is a reversed full n-gram sort 204. The reversed full n-gram sort 204 is similar to the direct full n-gram sort 202, except that the n-grams are listed in reverse traversal order from the right-most word to the left-most word. Thus, as shown in the reversed full n-gram sort 204, for each order of n-gram, the possible combinations of words for each n-gram are organized such that the leftmost word is changed most frequently, while the rightmost word stays the same for every possible n-gram ending with that word. For example, for 2-grams, the right word "a" is the same for each possible right word (e.g., a a; b a; c a).

A third sorting technique is a reversed context n-gram sort 206. In the reversed context n-gram sort 206, the context is first sorted in reverse traversal order from the right-most word to the left-most word. Then the future word is sorted within the same context. For example, in the 3 grams for the reversed context n-gram sort 206, the first two words represent the context for the 3-gram. They are each sorted in reverse traversal order, e.g., a a; b a; c a. The third word of the 3-gram is the future word. For each possible context, each future word is listed. For example, for the context (a a), there are three different future words sorted in vocabulary order: (a a a; a a b; a a c).

A fourth sorting technique is a combined reversed full n-gram sort 208. In the combined reversed full n-gram sort 208, the 1-grams, 2-grams, and 3-grams are combined into a single list. Shorter n-grams occur in the list before longer n-grams that share the same words (e.g., a; a a; a a a). A combined sort can be used with the other sorting techniques described above (e.g., a combined direct full n-gram sort, a combined reversed context n-gram sort). However, the combined sort is not a standard ARPA language model representation, because the ARPA language model representations requires separation of n-grams according to n-gram order.

Figure 3:
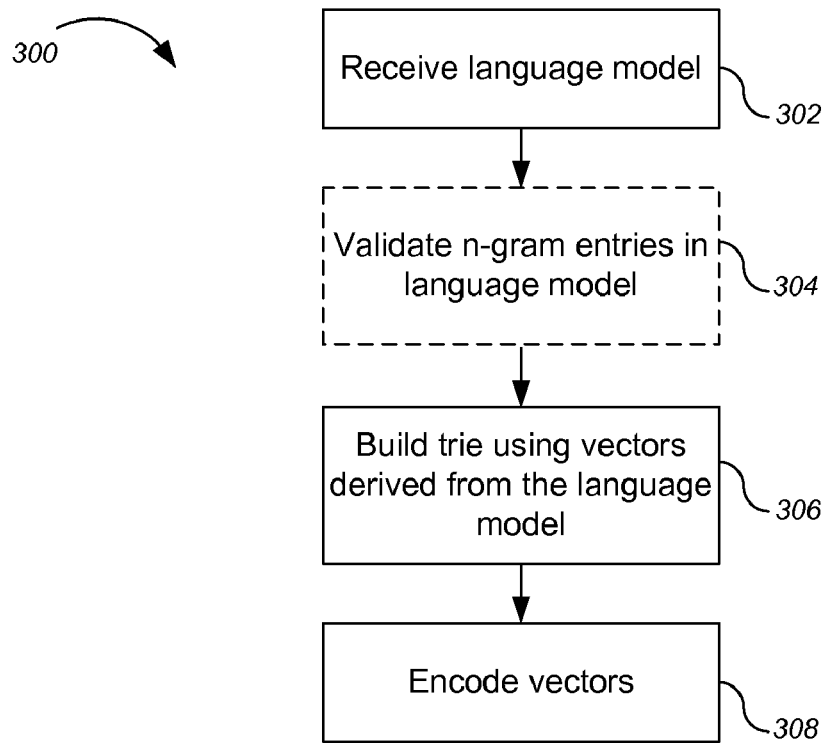
FIG. 3 is a flowchart illustrating a method for encoding a language model using a trie.

FIG. 3 shows a flowchart illustrating a method 300 for encoding a language model using a trie structure. For convenience, the method 300 will be described with reference to a system that performs the method 300. The system receives a language model (step 302). The received language model includes a collection of n-grams and associated probabilities as described above. Additionally, the received language model can also include back-off weights for each n-gram of less than maximum order.

In some implementations, the system receives a corpus for building the language model. The system uses the corpus to determine a collection of n-grams and associated probabilities and back off weights to build a language model as described above.

The system can optionally validate the collection of n-grams in the language model (step 304). For example, a constraint can be applied such that whenever any n-gram is present in the language model, the right context for the n-gram must also be present at the next lower n-gram order. For example, if the 3-gram entry is "the black sheep", there must be an entry for the right context "black sheep" in the 2-gram section of the language model. This constraint is referred to as a "gradual back-off" constraint. If the received language model does not satisfy the gradual back-off constraint, n-gram entries can be added to the language model so that the constraint is satisfied. In some implementations, the language model also satisfies a left nesting constraint. The left nesting constraint provides that for every n-gram entry (context, w), the context must be present as an n-gram in the language model, e.g., for "the black sheep", "the black" must be a 2-gram entry as well.

In some implementations, a preprocessing pass is applied to the language model in order to add missing context n-grams. A probability is assigned to each added context entry as p(context)=BOW(context of context)×p(right context of context). The back-off weight of the context entry can be assigned a value of 1.0. Additionally, the BOW(context of context) can also be assigned a value of 1.0, if it does not already occur in the language model.

In other implementations, a combined sort is used to insert missing n-grams on the fly as the n-grams of the language model are scanned during validation. The back-off weights for added entries can again be assigned a value of 1.0. The probability for the added entries can initially be given a value as undefined such that an additional processing is performed at runtime. Alternatively, an additional post-processing pass can be performed that enters the probability as p(added n-gram)=BOW(context of context)×p(right context of context). In this case, the probability cannot be calculated on the fly because the context of context may occur later in the combined sort for the n-grams in the language model.

Using the combined reversed full n-gram sort, missing n-grams can quickly be identified. For example, if the 2-gram "b c" is missing, this is detected when the 3-gram "a b c" is identified in the language model. In the combined reversed full n-gram sort, the missing 2-gram "b c" should have occurred immediately prior to the 3-gram "a b c". Thus, the missing 2-gram can be inserted on the fly prior to "a b c". More generally, any missing right context should appear as a separate entry immediately before it appears in a larger order n-gram. The insertion can be recursive. For example, if both "b c" and "c" are missing, they can both be inserted when "a b c" is encountered.

The system builds a trie structure using vectors derived from the language model (step 306). A trie is an ordered tree data structure. The trie includes nodes corresponding to words. The trie structure identifies key values that correspond to strings (e.g., n-grams). Each node in the trie has a position identifying what key the node is associated with. The descendants of a given node have a common prefix of the string. In particular, the trie can be an integer trie, where each n-gram is represented by a unique integer value from 0 to the number of n-grams−1. Consequently, there is a 1:1 mapping between integer values and n-grams in the language model. The vectors are used to define the ordered tree data structure of the trie such that the vectors can be used to identify keys corresponding to particular n-grams. Additionally, the vectors can be constructed such that only incremental data is added to each vector whenever a new n-gram is scanned, thus making the language model representation very compact.

Figure 4:
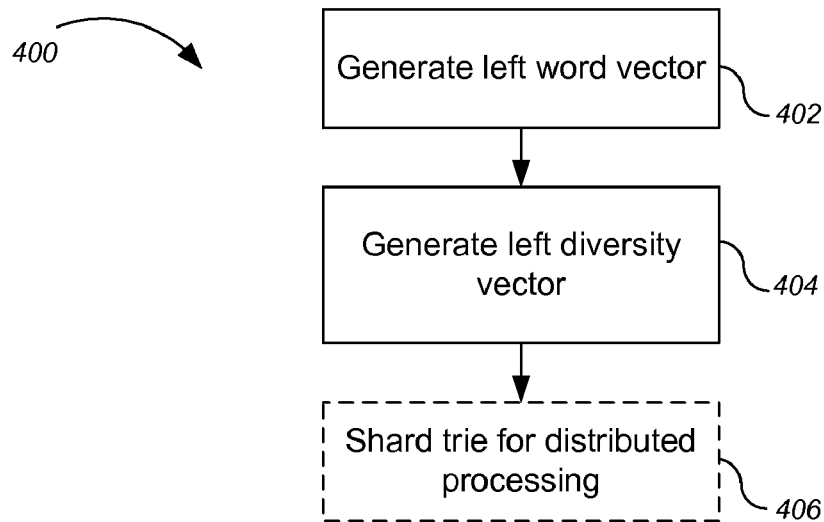
FIG. 4 is a flowchart illustrating a first method for building a trie.

FIG. 4 is a flowchart illustrating a first method 400 for building a trie using two vectors. In this implementation, a reversed full n-gram sort is used to build the trie. The trie is built by generating the two vectors from the language model.

The system generates a left word vector (step 402). The left word vector identifies words as integers and has a length equal to the number of n-grams in the language model. The system adds each new left word seen in a given right context to the left word vector.

The system generates a left diversity at context vector ("left diversity vector") (step 404). The left diversity vector is indexed by the integer key assigned to a given right context. The left diversity vector stores the number of different left words seen in a given right context. The number of entries in the left diversity vector is specified as the number of n-grams less the number of n-grams at maximum order (e.g., if there are 19 separate n-grams and 2 n-grams at maximum order, the number of entries in the left diversity vector is 17). This is because the largest order n-grams are never the context of another n-gram. Each entry in the left diversity vector corresponds to a count. The count of each entry represents a number of different left words for a particular right context In some implementations, the two vectors are generated as follows. For each n-gram in the language model, the left word of the n-gram is added to the left word vector. The diversity counter of the left diversity vector corresponding to the right context of the n-gram is incremented. As a result, each n-gram receives as its integer key the index of its left word as the left word vector is generated.

For example, consider the following two sentences:
 <s> the car <UNK> </s>, and
 <s> a <UNK> </s>,
where <s> represents the beginning of a sentence, </s> represents the end of a sentence, and <UNK> represents a rare word. The reversed n-gram sort provides the following sorting in the language model:
1-grams: 6
<s>
</s>
<UNK>
a
car
the
2-grams: 6
<UNK> </s>
a <UNK>
car <UNK>
<s> a
the car
<s> the
3-grams: 5
a <UNK> </s>
car <UNK> </s>
<s> a <UNK>
the car <UNK>
<s> the car
4-grams: 2
the car <UNK> </s>
<s> the car <UNK>

The generated vectors forming the trie structure are:

Left word vector=<s>__</s>__<UNK>_a_car_the__
 <UNK>_a_car__<s>_the__<s>_a_car__
 <s>_the__<s>_the__<s>

Left diversity vector=0__1__2__1__1__1__2__1__1__0__
 1__0__0__1__0__1__0.

While the left word vector is illustrated with the left words added to the left vector for clarity, the vector can be represented with corresponding integer values. There are 19 entries in the left word vector corresponding to the 19 distinct n-grams in the sample language model.

The entries of the left diversity vector are zero initially (i.e., empty counters). The values are incremented according to the following process. The left word vector is initially built with each 1-gram of the vocabulary in the order given by the language model. These 1-grams do not have contexts, so they do not affect the left diversity vector. Beginning with the 2-grams in the language model, the first six entries (i.e., corresponding to the number of words in the vocabulary) in the left diversity vector, the number of left words in every single word right context is counted.

For example, the first entry counts the diversity in right context for <s>, which is the first word in the vocabulary. The value is zero because there are no 2-grams that end in <s>. The second entry counts the diversity in right context </s>, the second word in the vocabulary. The value of the second entry is one because only one 2-gram ends with </s>. The third entry counts the diversity in right context <UNK>, which is two because there are two 2-grams that have <UNK> as the right context, i.e., "a <UNK>" and "car <UNK>". The process continues for each 2-gram. Each time a counter in the left diversity vector is incremented, a left word is added to the left word vector.

For the 3-grams, the key of the right context for the 3-grams, which are 2-grams, are calculated. For example, the first 3-gram is "a <UNK> </s>". Therefore, the key for the 2-gram "<UNK> </s>" is calculated. The key for the 2-gram "<UNK> </s>" is equal to the sum of the number of words in the vocabulary and the position of the 2-gram in the sorted language model. In this case, it is the first 2-gram in the sorted language model, therefore the key is 6+1=7. The key of seven means that the counter corresponding to the seventh entry in the left diversity vector is incremented for each different left word having a right context of "<UNK> </s>". In this case, the seventh entry is incremented by two, i.e., for "a <UNK> </s>" and "car <UNK> </s>".

Each time the right context changes, a new key is calculated and the appropriate counter in the left diversity vector is incremented. The entries are not necessarily sequential. As shown above in the left diversity vector, some values can be zero. For example, the 3-gram "<s> the car" has a right context of "the car". The key value for "the car" is eleven. The eleventh entry in the left diversity vector is incremented by one. There is no 2-gram key equal to ten and corresponding to the tenth entry in the left diversity vector, therefore the count in left diversity vector entry ten remains zero.

In addition, when the language model satisfies the gradual back-off constraint, the process of building the trie structure insures that a key value has been assigned to each right n-gram in the language model, prior to encountering it as a right-context in an n-gram at the immediately higher order.

The generated left word vector and left diversity vector define the trie structure. The key value of each n-gram is indexed in the left word vector. Consequently, the two vectors can be traversed to find the key value corresponding to a particular n-gram. The operation of looking up a particular key for a given n-gram is discussed in greater detail below.

The system optionally shards the trie (step 406). The trie can be sharded as part of the language model such that the integer values of the vectors making of the trie are stored on a number of different machines. When looking up a key for a particular n gram, the search can be limited to a particular shard machine that includes the integer key values and their corresponding n grams. Sharding the trie structure is described in greater detail below.

Figure 5:
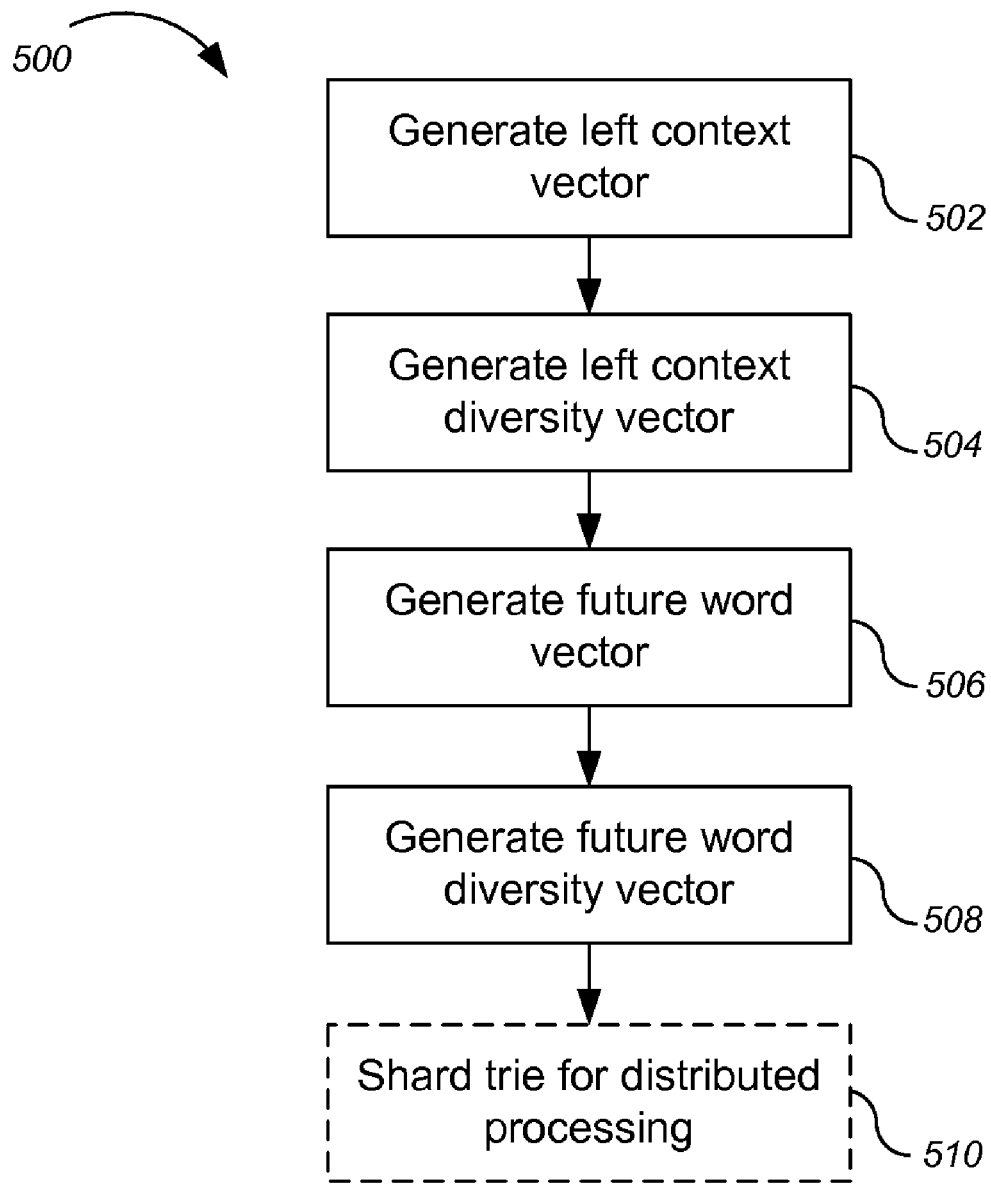
FIG. 5 is a flowchart illustrating a second method for building a trie.

FIG. 5 is a flowchart illustrating a second method 500 for building a trie using four vectors. In this method, a reversed-context sort is used to build the trie.

The system generates a left context vector (step 502). The left context vector stores each new left word seen in a given context of the language model. The left context vector stores the left words for a given context as integer values beginning with zero. The left context vector has a length equal to the number of contexts in the language model.

The system generates a context diversity vector (step 504). The context diversity vector is indexed by the integer key assigned to a given right context. The context diversity vector stores a number of different left words seen in a given context. The length of the context diversity vector is equal to the number of backed-off contexts, i.e., (context−1).

The system generates a future word vector (step 506). The future word vector stores each new future word seen in a given context. The future word vector stores the future words as integer values beginning with zero. The future word vector has a length equal to the total number of n-grams in the language model.

The system generates a future diversity vector (step 508). The future diversity vector is indexed by the integer key assigned to a given context. The future diversity vector stores a number of different future words seen in a given context. The future diversity vector has a length equal to the total number of contexts in the language model.

In some implementations, the four vectors are generated as follows. For an n-gram in the language model having a new context, the left word is pushed on to the left word vector. The context diversity vector corresponding to the backed-off context is incremented. For example, if the context is "the black", the backed-off context is "black". Thus, the counter for the entry in the context diversity vector is incremented for each left word having the same backed off context. The future word for the n-gram is then added to the future word vector. The future diversity counter corresponding to the context is incremented. In this process, each n-gram, (context, w), receives as its integer key the index of its future word, w, as the future word vector is built. Additionally, each context receives as its integer key the index of the left word as it is added to the left word vector.

For example, for the same two sentences used above:
<s> the car <UNK> </s>, and
<s> a <UNK> </s>,
the reversed context n-gram sort provides the following sorting in the language model:
1-grams: 6
<s>
</s>
<UNK>
a
car
the
2-grams: 6
<s> a
<s> the
<UNK> </s>
a <UNK>
car <UNK>
the car
3-grams: 5
a <UNK> </s>
car <UNK> </s>
<s> a <UNK>
the car <UNK>
<s> the car
4-grams: 2
the car <UNK> </s>
<s> the car <UNK>

The generated vectors for the trie are:

Left context vector=<s>__</s>__
    <UNK>__a_car_the_a_car__<s>_the__<s>_the__
    <s>

Context diversity vector=0__0__2__1__1__1__0__1__0__
    1__0__0__0

Future word vector=<s>__</s>__
    <UNK>__a_car_the_a_the__</s>__<UNK>__
    <UNK>__car__</s>__</s>__<UNK>__
    <UNK>__car__</s>__<UNK>

Future diversity vector=2__0__1__1__1__1__1__1__1__
    1__1__1__1.

While the left context vector and future word vector are each illustrated with the particular words added to the respective vectors, the vectors can be represented with corresponding integer values.

The four generated vectors define the trie structure. The four vectors can be traversed to find the key value corresponding to a particular n-gram. The operation of looking up a particular key for a given n-gram is discussed in greater detail below.

The system optionally shards the trie (step 510). The trie can be sharded as part of the language model such that the integer values of the vectors making of the trie are stored on a number of different machines. When looking up a key for a particular n-gram, the search can be limited to a particular shard machine that includes the integer key values and their corresponding n-grams. Sharding the trie structure is described in greater detail below.

As shown in FIG. 3, the system encodes the vectors (step 308). In some implementations, the vectors are block encoded. Block encoding reduces the storages space necessary to store the vectors. The vectors have integer values as entries. In particular, block encoding techniques use the distributional properties of numbers/symbols represented in a particular order to identify a more compact representations for blocks of the ordered numbers/symbols. Block encoding techniques take input blocks of numbers/symbols having specified length and identify a lossless representation requiring less space than the input block. For example, most entries in the diversity count vector are small and do not require the space allotted (e.g., 4 bytes) to store each entry individually. Example block encoding techniques include Huffman coding and Elias gamma coding. Additionally, other block encoding techniques can be used.

FIG. 6 is a flowchart illustrating a method 600 for identifying the probability for n-grams in a string using a trie. The system receives a string (e.g., of text) including one or more n-grams (step 602). The string of text can be, for example, a string of text generated from an optical character recognition, voice recognition, or machine translation operation. The string can include text forming words, punctuation symbols, and other characters. Additionally, the string can include information for identifying a beginning of a sentence, an end of a sentences, or other information about the content of the string.

The system identifies a key value for each n-gram in the string using the trie (step 604). Each n-gram in the language model has a corresponding integer value, which can be identified by traversing the vectors of the trie. If the n-gram of the string of text is not found within the trie, other processing can be performed, for example, identifying a key value for the context of the n-gram and the right context of the n-gram. For example, if "the black sheep" is not an n-gram found in the language model, the key values for the context "the black" and the right context "black sheep" can be used to calculate a probability for "the black sheep" using the associated probabilities and back-off weights as described above.

The system identifies the probability for the each n-gram corresponding to the respective identified key value (step 606). The key value matches to the entry in the language model for the n-gram, which includes the probability for the n-gram based on the relative frequency of the n-gram in the corpus upon which the language model was built. When the full n-gram was not identified, the probability and the back-off weight associated with the context can also be identified from the entry in the language model corresponding to the context. The probabilities of the n-grams within the string can be identified in order to identify whether the string of text is likely correct. For example, an optical character recognition (OCR) application can predict a particular string of words according to the particular criteria of the OCR application. The string can be tested against the language model to determine whether the predicted string is likely to be correct according to the probabilities of the n-grams which make up the string.

FIG. 7 is a flowchart illustrating a method 700 for identifying a key value for an n-gram using the trie structure of FIG. 4. The trie described in FIG. 4 is built using two vectors, the left word vector and the left diversity vector. The vectors are built using the language model for the two sample sentences:
<s> the car <UNK> </s>, and
<s> a <UNK> </s>.
These are used to form vectors:

Left word vector=<s>_ </s>_ _<UNK>_a_car_the_ _<UNK>_a_car_<s>_the_<s>_a_car_ _<s>_the_<s>_the_<s>

Left diversity vector=0_1_2_1_1_1_2_1_1_0_ _1_0_0_1_0_1_0.

The system identifies an n-gram from a string of text (step 702). For example, the identified n-gram from the string of text can be "<s> the car". The trie is used to find the key value for "<s> the car", key(<s> the car).

The system identifies a key corresponding to each incrementally increasing right context of the n-gram from one to the highest order right context, of the n-gram using the two vectors (step 704). The system calculates a key value for each right context of the n-gram beginning with the last word in the n-gram. The key value for the single word right context in the n-gram is then used to find the key value for the two word right context. The key value for each incremental word added to the right context is found using the left word vector and the left diversity vector. The process continues until the key for the entire right context is calculated.

Specifically, for the example n-gram "<s> the car", to calculate the key for the right context, the system first identifies the key for the last word of the right context: "the car". For the n-gram "<s> the car", the system identifies a first key for "car", key(car). The last word of the n-gram does not have a context, and is represented as one of the 1-grams in the beginning of the left word vector. Therefore, the word "car" occurs in the left word vector some place in a first range of [0-5], because there are six words in the vocabulary. A binary search for "car" in this range of the left word vector produces a corresponding key(car) equal to four. The key is the position of the word "car" in the first range of the left word vector. The corresponding left diversity vector entry corresponding to the key value of four is one, i.e., the fourth entry in the left diversity vector is "1".

To find the right context key, key(the car), a second range in the left word vector is determined. The beginning of the range is equal to the sum of the diversity counts having an index position less than the key(car) and the vocabulary size. The diversity index values less than key(car) are 0, 1, 2, and 1. The vocabulary size is six. Thus, the beginning of the range is equal to 1+2+1+6=10. The end the range is determined by the count of the left diversity vector at key(car). As described above, the diversity count value at key(car)=four is one, therefore, the second range in the left word vector is [10, 11). The left word vector is searched for "the" within the second range. The word "the" is found in the left word vector at entry ten, therefore the key(the car) is equal to ten.

The system identifies a key for the n-gram (step 706). The system performs a binary search for the left word of the n-gram over a particular range. The beginning of the range is calculated by accumulating all diversity counts in the left diversity vector having an index lower than the value of the key of the right context, key(right context), and adding the vocabulary size (i.e., number of 1-grams in the language model). The system then calculates the length of the range as the count of the entry in the left diversity vector corresponding to the key(right context). The system then searches for the left word over the calculated range. The index of the left word in the left word vector is then returned as the key for the n-gram, key(context, w).

The system identifies the value in the left diversity vector, corresponding to the right context key, key(the car). The left diversity vector value is identified as one because the count of the tenth entry in the left diversity vector is one. Finally, to find the key for the n-gram, key(<s> the car), a third range in the left word vector is determined. The beginning of the range is equal to the sum of the diversity counts for entries of the left diversity vector having an index position less than key(the car) and the vocabulary size. The beginning of the range is equal to the sum of the first nine entries of the left diversity vector and the number of words in the vocabulary, which is equal to 16. Since the value of the entry in the left diversity vector corresponding to key(the car) is equal to one, the range is [16, 17). The system searches the left word vector for "<s>" within the third range. The word "<s>" is found in the left word vector at entry 16, therefore the key(<s> the car) is equal to 16. The key value for the n-gram can then be used to identify the corresponding probability for the n-gram in the language model.

In some implementations, the probability can be identified for n-grams for which a key value is not found. For example, assuming that the n-gram is "<s> the car" and the word "<s>" was not found within the range of [16, 17). This means the particular n-gram, "<s> the car", is not found in the language model. A similar process as above can be used to find the key for the n-gram context "<s> the". Assuming that "<s> the" exists in the language model, the key value for "<s> the" can be matched to the corresponding back-off weight in the language model. The probability of the n-gram can be determined as a function of the back off weight associated with the n-gram context and the probability of the right context "the car". Specifically, p(car|<s> the)=BOW(<s> the)×p(car|the).

FIG. 8 is a flowchart illustrating a method 800 for identifying a key value for an n-gram using the trie structure of FIG. 5. The trie described in FIG. 5 is built using four vectors, the left context vector, the context diversity vector, the future word vector, and the future diversity vector. Examples of the four vectors are shown below using the language model for the two sample sentences:

<s> the car <UNK> </s>, and
<s> a <UNK> </s>.
The sentences are used to form the vectors:

Left context vector=<s>_</s>_
  <UNK>_a_car_the_a_car_<s>_the_<s>_the_
  <s>

Context diversity vector=0_0_2_1_1_1_0_1_0_
  1_0_0_0

Future word vector=<s>_</s>_
  <UNK>_a_car_the_a_the_</s>_<UNK>_
  <UNK>_car_</s>_</s>_<UNK>_
  <UNK>_car_</s>_<UNK>

Future diversity vector=2_0_1_1_1_1_1_1_1_
  1_1_1_1

The system identifies an n-gram from a string of text (step 802). For example, the identified n-gram from the string of text can be "<s> the car". The trie is used to find the key value for "<s> the car", key(<s> the car).

The system identifies a key for each incrementally increasing context of the n-gram, key(context), using the vectors, (step 804). The system iteratively calculates a key value for each context beginning with the last word in the context and continuing until the key for the highest order context has been calculated. The key value for each context of the n-gram is found using the left context vector and the context diversity vector. The key value for the single word context is then used to find the key value for the two words context. The process continues until the key for the largest order context is calculated.

Specifically, for the example n-gram "<s> the car", to calculate the key for the context, the system first identifies the key for the last word of the context, "<s> the", i.e., a key for "the", key(the). The last word of the context is a single word, and therefore is represented as one of the 1-grams in the beginning of the left context vector. Therefore, the word "the" occurs in the left context vector some place in a first range of [0-5), because there are six words in the vocabulary. A search (e.g., a binary search) for "the" in this range of the left context vector produces a corresponding key(the) equal to five. The key is the position of the word "the" in the left context vector. The corresponding context diversity vector value for the key value of five is one, i.e., the value of the fifth entry in the context diversity vector is "1".

To find the context key, key(<s> the), a second range in the left context vector is determined. The beginning of the range is equal to the sum of the context diversity counts having an index position less than the key(the) and the vocabulary size. The context diversity index values less than key(the) are 0, 0, 2, 1, and 1. The vocabulary size is six. Thus, the beginning of the range is equal to 2+1+1+6=10. The end the range is determined by the count of the diversity at key(the). Since the diversity count value at the entry corresponding to the key value of five is equal to one, the second range in the left context vector is [10, 11). The left context vector is searched for "<s>" within the second range. The word "<s>" is found in the left context vector at entry ten, therefore the key(<s> the) is equal to ten.

The system identifies a key for the whole n-gram (step 806). The key value of the context for the n-gram is used to calculate a range in the future word vector to search for the future word in the n-gram. The system calculates the beginning of the range by summing values of entries in the future diversity vector having an index lower than the value of the key of the context, key(context), and adding the vocabulary size. The system then calculates the length of the range according to the count of the entry in the future diversity vector, which corresponds to the key(context). The system then searches for the future word over the calculated range in the future word vector. The index of the future in the future word vector is then returned as the key for the n-gram.

Returning to the example n-gram, the system identifies the value in the future diversity vector corresponding to the key of the context, key(<s> the). The key value of ten for the context corresponds to a future diversity vector entry of one. Accumulating the values of the future diversity vector entries less than entry ten is also equal to ten. Thus, the beginning of the range to search in the future word vector is ten plus the vocabulary size, totaling 16. The length of the range is equal to the count of the entry corresponding to the key(context), which is equal to one. Thus, the future word vector is searched over the range [16, 17). The future word "car" is found at entry 16 of the future word vector. Therefore, the key for the n-gram "<s> the car" is 16. The key can then be matched to an entry in the language model in order to identify the corresponding probability for the n-gram.

In some implementations, the probability is identified for n-grams for which a key value is not found. For example, assuming that the n-gram "<s> the car", the future word "car" was not found within the range of [16, 17). This means the particular n-gram, "<s> the car", is not found in the language model. The probability for the n-gram can be determined as a function of the back-off weight for the context of the n-gram and the probability for the right context. In this situation, however, the key for the context has already been identified, and therefore the corresponding back-off weight can be determined from the n-gram entry corresponding to the context key. The key corresponding to the right context can be determined such that the overall probability of the n-gram can be calculated.

As described above, in some implementations, the language model is sharded. Sharding separates the n-grams of the language model in a distributed system. In some implementations, the sharding is performed such that if an n-gram is not found in a shard, the backed off content can be found without searching a different shard. For example, if a 3-gram "the black sheep" is not found in a particular shard, the 2-gram "the black" can be found in the shard. Consequently, some entries of the language model can be duplicated on multiple shards in order that a search for n-gram back-off values can be performed without changing shards when the whole n-gram is not found.

One sharding technique is context sharding. Context sharding can be implemented to satisfy one or more of three primary goals. A first goal is to facilitate requests for future word probabilities given a context, p(w|context). That is, the probability for any future word having the same context can be calculated using a single shard containing the context. A second goal is to perform all back-off calculations within the same shard. A third goal is to have all shards be substantially the same size.

The first goal can be satisfied by sharding according to the context of the n-grams in the language model. For example, a hash function applied to the language model can be based on the context, hash(context).

However, to also satisfy the second goal, additional operations are performed. Instead of sharding the entire context, sharding is performed on the last word of the context only. Additionally, the empty context (i.e., the 1-grams) are duplicated on all shards. This allows for a back-off from a 2-gram to a 1-gram within each shard for any 2-gram.

A sharding function identifies which shard to access when retrieving a particular n-gram. One example sharding function first identifies if the context has a length greater than one. If the length of the context is greater than one, the sharding function returns a hash value for the last word in the context. If the length of the context is not greater than one, the sharding function returns a hash value for the full context. The hash value identifies the shard containing the particular n-gram. An example sharding function can be written as:

sharding_function(context, w):
if length(context)>1
return hash(context_{-(n-2)}) % num_shards //last word
else
return hash(context) % num_shards A corresponding distribution function is used to identify which shard or shards should store a particular n-gram. According to the distribution faction, if the context is equal to zero (e.g., 1-gram), than all shards are returned (i.e., the 1-gram is stored on every shard). Otherwise, a single shard is returned corresponding to the sharding function applied to the n-gram. An example distribution function can be written as:

distribution function(context, w):
if length(context)==0
return {0 . . . num_shards−1} //all shards
else
return {sharding_function(context, w)} //one shard only Satisfying the third goal also requires additional processing. For example, with the above sharding function, the shards tend to be unbalanced. This is due to very frequent words (e.g., "or" or punctuation, e.g., ".") occurring in a very large number of n-grams. As a result the shards containing those words tend to be much larger than an average shard.

One technique for balancing the shard sizes is to shard the last two words of the context instead of only the last word. However, this requires duplicating all 2-grams in addition to the 1-grams in each shard to satisfy the single shard back-off requirement.

An alternative technique for balancing shard sizes is to split large shards into multiple shards such that the resulting shards substantially correspond to an average shard size.

An example balanced sharding function identifies a shard identifier as equal to the sharding function for an n-gram. If the length of a context is greater than one and the shard identifier is in a set of outlier shards, the shard is split. An outlier shard can be a shard having a size greater than a threshold amount (e.g., some percentage larger than average shard size). Outlier shards can be identified, for example, by generating all shards and determining their size. Alternatively, a preprocessing can be performed that does not generate shards, but instead identifies the number of entries that would go into each shard. The split shard identifier is equal to the hash of the last two words of the context (or in some implementations using additional words of the context). If the split identifier is greater than zero, the shard identifier is equal to a base shard identifier added to a split identifier−1. An example balanced sharding function can be written as:

```
balanced_sharding_function(context, w):
    shard_id = sharding_function(context, w)
    if length(context) > 1 and shard_id in set of outlier shards
        split_id = hash(context_{-(n-2)..-(n-3)}) % num_splits(shard_id)// last 2 words
        if split_id > 0
            shard_id = extra_shard_id_base(shard_id) + split_id−1
    return shard_id
```

If an n-gram falls within an outlier shard, then the system determines which of the split shards should be used according to a hash function of the last two words in the context. The num_splits(shard_id) is the number of splits used for the particular outlier shards. If a selected split identifier is 0, then the original shard identifier is used. Otherwise, the system uses one of the extra shards assigned to the original shard identifier.

The balanced sharding function results in an increased number of shards, but the resulting shards are more evenly sized.

When using the balanced sharding function, the 2-grams of the outlier shards are duplicated across all corresponding splits (i.e., 2-grams in the shard need to be duplicated in each split shard). An example balanced distribution function can be written as:

```
balanced_distribution_function(context, w):
    if length(context) == 0
        return {0..num_balanced_shards-1}      //all shards
    shard_id = sharding_function(context, w)
    if shard_id in set of outlier shards and length(context) == 1
        return {shard_id, extra_shard_id_base(shard_id) ..
extra_shard_id_base(shard_id) + num_splits(shard_id)
    else if shard_id in set of outlier shards and length(context)
> 1
        return {balanced_sharding_function(context, w)}   //a
particular split
    else
        return {shard_id}            //a particular shard
```

In some implementations, shards that are still large relative to the average shard size are further split in a similar manner by taking the last three words of the context into account.

Another sharding technique is restricted context sharding. Restricted context sharding always shards on the last two words of the context. In restricted context sharding, 1-grams are duplicated on all shards and some 2-grams are duplicated. Not all back-off operations can be processed in the same shard in restricted context sharding. However, back-off can always be done within the same shard for all contexts that occurred in the training data.

A set, C, of all contexts occurring in the language model is represented by:

$C=\{context: there exists (context, w) in the LM\}$.

The context can have any length from 0 to n−1, where n is the size of a given n-gram. The back-off context is represented by (context_{−k}) derived from a given context after k back-offs. For example, for the context "the black", context_{−1} is "black". Therefore, the context is represented as: context_{0}. Additionally, the empty context, where the back-off has resulted in just a 1-gram, is represented as: context_{−(n−1)}.

The set C is split into k mutually disjoint sets using a sharding function that takes as an argument the identity of (context_{−n+3}), which represents the last two words of the context. The whole context is used if it is less than two words in length.

The restricted context sharding model can be written as:

```
for every n-gram (context, w) in our language model:
    * identify shard s = restricted_sharding_function
(context_{-n+3}  //last two words of context
    * for o = 0; o<n; ++o
        -write context_{-(n-1)+o} and BOW(context_{-(n-1)+o+}) to
shard
s
        -for all w seen in context_{-(n-1)+o},
        # write (context_{-(n-1)+o}, w) and
P(w|context_{-(n-1)+o}) to shard s
```

In the integer trie representation of the language model, information is written incrementally to the model. For example, writing the BOW for a given context is provided for in the model by:

−write context_{−(n−1)+o} and $BOW$(context_{−(n−1)+o}) to shard s.

Additionally, probabilities for future words, w, in a given context, are provided in the model by:

−write (context_{−(n−1)+o}, w) and p(w|context_{−(n−1)+o}) to shard s.

All shards do not necessarily share all 1-grams and 2-grams. There may be words z for which all continuations result in the sharding function picking only a subset of shards and avoiding other shards entirely. For example, define a set Z(s) is defined by: Z(s)={z: there exists context (c, z) in the language model such that sharding_function(c z)==s}. If this set is smaller than the whole vocabulary, then we have identified 2-grams (c z) that do not be stored on shard s.

In this model, an example restricted sharding function is provided by:

```
restricted_sharding_function(context, w):
    if length (context) > 2
        return hash(context_{-(n-2)..-(n-3)}) % num_shards
//last two words
    else
        return hash(context) % num_shards
```

Additionally, an example restricted distribution function is:

```
restricted_distribution_function(context, w):
    if length (context) == 0
        return {0..num_ shards-1}     //all shards
    else if length (context) == 1
        //set of all shards that contain a longer context ending in
the current context
        return {s : exists context* such that contex*_{-(n-2)} =
context and s = restricted_sharding _function (context, w)
    else
        return restricted_sharding_function (context, w)
```

All of the shards returned by the restricted sharding function receive the corresponding probability, p(w|context), and context back-off weight, BOW(context) data.

Figure 9:
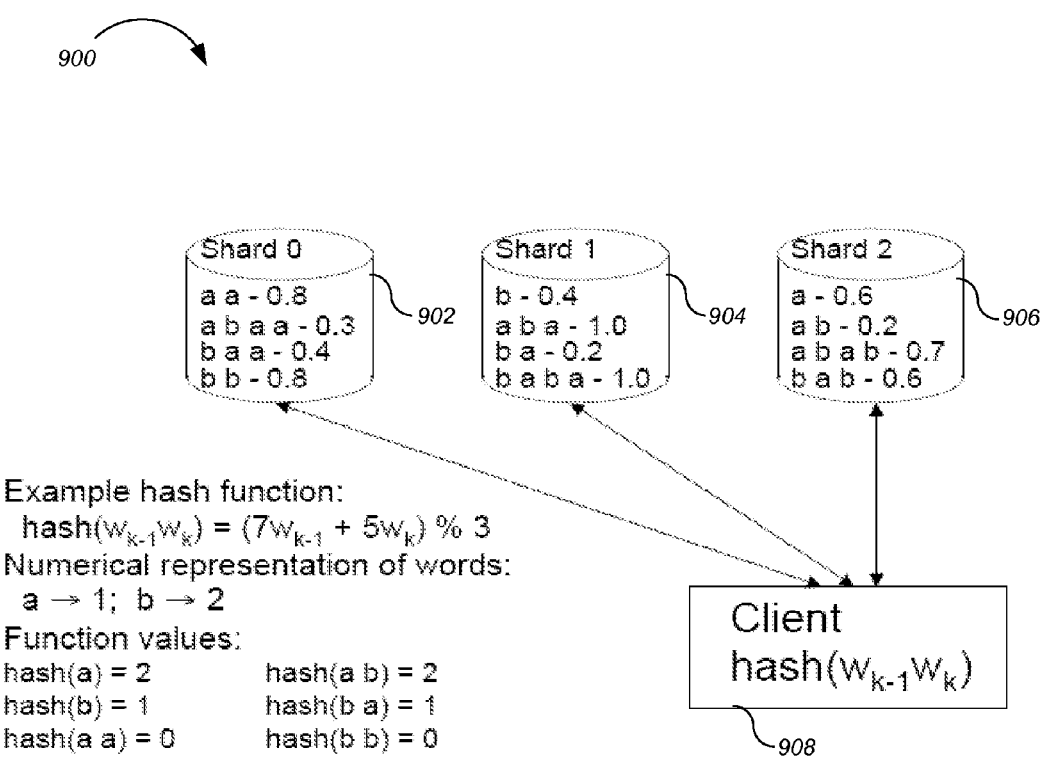
FIG. 9 is a block diagram illustrating an example of for looking up sharded n-grams.

FIG. 9 is a block diagram 900 illustrating an example of looking up n-grams in a sharded system. In FIG. 9, sharding was performed using the last two words of each n-gram, ($w_{k−1}$, $w_k$) or all words when the n-gram has fewer than two words. The vocabulary includes two words (a, b).

Three shards are provided, Shard 0 (902), Shard 1 (904), and Shard 2 (906). Shard 0 (902) includes n-grams and associated probabilities for a a; a b a a; b a a; and b b. Shard 1 (904) includes n-grams and associated probabilities for b; a b a; b a; and b a b a. Shard 3 (906) includes n-grams and associated probabilities for a; a b; a b a b; and b a b.

The n-grams are assigned to one of the shards according to a particular hash function. An example hash function for the shards 902, 904, and 906 is:

hash($w_{k−1}w_k$)=($7w_{k−1}$+$5w_k$)%3.

Each word is represented by a numerical value. For example word "a" corresponds to one and word "b" correspond to two. The result of the hash function identifies the shard for the n-gram based on the last two words of the n-gram. For example, hash(a)=2, hash(b)=1, hash(a a)=0, hash(a b)=1, and hash(b b)=0. Thus, a is placed in shard 2, b is placed in shard 1. Additionally, larger n-grams are placed based on the hash of the last two words. For example, the n-gram "b a b a" is placed in Shard 1 (904) because the hash of the last two words, hash(b a) is equal to one.

FIG. 9 also illustrates a client 908. The client 908 can be used to look up sharded n-grams. For example, to look up the n-gram "a b a a", the client 908 identifies the last two words of the n-gram, which are "a a". The client 908 then applies the hash function to the last two words, hash(a a), which returns a value of zero. Therefore, the client 908 sends a request for the n-gram "a b a a" to Shard 0 (902).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   a computer-readable storage medium including instructions; and
   data processing apparatus capable of executing the instructions to perform operations comprising:
     generating a compact language model, including:
       receiving a collection of n-grams from a corpus, each n-gram of the collection having a corresponding first probability of occurring in the corpus, and
       generating a trie representing the collection of n-grams including calculating a left word vector and a diversity count vector using the collection of n grams, the left word vector identifying each distinct left word for a given right context in the collection, the diversity count vector identifying a count of distinct left words for each right context in the collection, and
     using the language model to identify a second probability of a particular string of words occurring.

2. The system of claim 1 in which the operations further comprise:
   representing entries in the left word vector and diversity count vector as integers; and
   encoding the left word vector and the diversity count vector using block encoding, where the block encoding encodes blocks of integers in each respective vector.

3. The system of claim 1 in which generating the trie further comprises:
   calculating a left context vector identifying each distinct left word for each distinct context in the collection, a left diversity vector identifying a count of distinct left words for each context in the collection, a future word vector identifying each distinct predicted word for a given context in the collection, and a future diversity vector identifying a count of distinct predicted words for each context in the collection.

4. A system comprising:
   a computer-readable storage medium including instructions; and
   data processing apparatus capable of executing the instructions to perform operations comprising:
     receiving a collection of n-grams, each n-gram having a corresponding first probability of occurring;
     generating a trie using a first vector and a second vector, the trie assigning one or more values identifying each n-gram in the collection of n-grams, and in which the first vector is a left word vector identifying each distinct left word for a given right context in the collection, the second vector is a diversity count vector identifying a count of distinct left words for each right context in the collection; and
     using the trie to identify the probabilities of occurring for corresponding n-grams in a received string that includes one or more n-grams.

5. The system of claim 4 in which using the trie further comprises:
   receiving one or more strings; and
   identifying a second probability for the occurrence of each string including identifying values in the trie corresponding to one or more n-grams of the string and identifying the corresponding first probabilities for the n-grams.

6. The system of claim 4 in which assigning one or more values identifying each n-gram further comprises:
   using a first key and the second vector to identify a range in the first vector to search for a next-to-last word in the n-gram, where the first key corresponds to a last word of the n-gram; and
   identifying a second key corresponding to the last word and next-to-last word of the n-gram using the identified range and the first vector.

7. The system of claim 4 in which the operations further comprise:
   representing entries in the first vector and the second vector as integers; and
   encoding the first vector and the second vector using a lossless block encoding technique, where the block encoding encodes blocks of integers in each respective vector.

8. The system of claim 4 in which generating the trie further comprises using a third vector and a fourth vector, where the first vector identifies each distinct left word for each distinct context in the collection, the second vector identifies a count of distinct left words for each context in the collection, the third vector identifies each distinct predicted word for a given context in the collection, and the fourth vector identifies a count of distinct predicted words for each context in the collection.

9. The system of claim 8 in which assigning one or more values identifying each n-gram further comprises:
   identifying a context key corresponding to the context of the n-gram using the first vector and the second vector;
   identifying a key for the n-gram using the context key and the third vector and the fourth vector.

10. The system of claim 8, further comprising:
    encoding the first, second, third, and fourth vectors using a lossless block encoding technique.

11. The system of claim 8, further comprising:
    dividing the trie into a plurality of shards, each shard including a cluster of n-grams; and
    storing one or more shards on each computer of a plurality of computers in a distributed system.

* * * * *